United States Patent [19]
Scott

[11] 3,794,840
[45] Feb. 26, 1974

[54] METHOD AND APPARATUS FOR DIRECTING A RADIATION BEAM TOWARD A TUMOR OR THE LIKE

[76] Inventor: Walter P. Scott, c/o Charlotte Memorial Hospital, P.O. Box 2554, Charlotte, N.C. 28201

[22] Filed: Mar. 27, 1972

[21] Appl. No.: 238,322

[52] U.S. Cl.................... 250/363, 250/64, 250/490
[51] Int. Cl............................................. G01j 39/18
[58] Field of Search .... 250/71.5 S, 61.5, 64, 83.3 R

[56] References Cited
UNITED STATES PATENTS

| | | | |
|---|---|---|---|
| 3,057,998 | 10/1962 | West | 250/71.55 |
| 3,654,465 | 4/1972 | Platz | 250/71.55 |
| 2,942,109 | 6/1960 | Bell et al. | 250/71.55 |
| 2,849,621 | 8/1958 | Clark | 250/64 |
| 3,114,043 | 12/1963 | Thomas et al. | 250/64 |

*Primary Examiner*—Harold A. Dixon
*Attorney, Agent, or Firm*—Richards, Shefte & Pinckney

[57] ABSTRACT

Method and apparatus for accurately directing a therapeutic radiation beam to a tumor or the like within a human body, including the implantation at the tumor of a source emitting radioactive rays traveling in a straight line therefrom, sensing this ray emission to determine a straight line path to the tumor, and directing the radiation beam toward the tumor by having the center line of the radiation beam coincide with the straight line path determined from the ray emitting source. Preferably, a radioactive isotope is implanted in the tumor as the source, and a collimating tubular channel member is selectively mounted on the radiation head of a radiation teletheraphy machine with the axis of the channel member coinciding with the center of the beam from the radiation head. One end of the channel member is open to receive rays emitted from the implanted source and the other end is associated with a device for detecting these rays. The detecting device produces an electrical signal in response to the rays sensed, this electrical signal being greater as the straight line path of emitted rays come into coincidence with the axis of the opening in the channel member, and the magnitude of the electrical signal is visually displayed. The teletherapy machine operator manipulates either the patient or the radiation head until the displayed signal indicates a maximum magnitude, removes the channel member and energizes the radiation head.

8 Claims, 3 Drawing Figures

3,794,840

METHOD AND APPARATUS FOR DIRECTING A RADIATION BEAM TOWARD A TUMOR OR THE LIKE

BACKGROUND OF THE INVENTION

Radiation therapy is, of course, a universally recognized method of treating cancer and other neoplastic diseases, and the degree of success which a radiotherapist realizes depends to a great extent on his ability to direct accurately the radiation beam to the precise area where cancerous tissue is present.

The size and internal location of a tumor within the body may be estimated with reasonable accuracy by a physical examination of the patient and a study of the roentgenographic and endoscopic evidence that is available, but even with the relatively precise determination of the internal location, the radiotherapist still has the problem of directing the radiation beam toward the tumor without the benefit of any external indicators or guides, and this directional problem is made more acute by the fact that the radiation head of the teletherapy machine must be spaced from the patient when the radiation beam is activated.

In an effort to overcome the problems inherent in trying to direct properly the radiation beam, several methods of improving the accuracy of the directed beam are in common practice. For example, the radiotherapist may prepare a life-size contour of the treatment area, and markings are actually placed on the patient's body to indicate such treatment areas. Then, the radiation beam is directed to this area by several different techniques, including the light localized method which utilizes shadowed cross-hairs emanating from the teletherapy machine and appearing on the patient's body at a point corresponding to the center of the radiation beam, the cone method which utilizes a structural extension between the head of the teletherapy machine and the treatment area, and the pen-and-arc technique which also includes a structural extension from the teletherapy machine.

While all of these, and similar, techniques result in a certain degree of radiation beam accuracy, they are not entirely reliable because of the generally empirical method of identifying the treatment area, and the fact that the patient's skin is somewhat motile whereby the treatment area markings on the patient are subject to variation as the position of the patient is changed.

By substantial contrast, the present invention provides a method and apparatus for precisely indicating the location of the tumor to be treated, and for accurately directing the radiation beam of the teletherapy machine toward the tumor.

SUMMARY OF THE INVENTION

In accordance with the present invention, a source which emanates straight line rays is surgically or otherwise located within the tumor itself, and the emitted straight line rays are sensed to determine a straight line path to the tumor. The center of the therapeutic radiation beam is then directed to coincide with this straight line path whereby the radiation beam will be directed precisely at the tumor.

In the disclosed embodiment of the present invention, the ray emitting source is a small radioactive isotope such as a chromium-51 pellet (usually referred to as a "seed") which has an energy level of 323 KEV and which is implanted in the tumor with a hollow needle or other surgical technique. This radioactive seed emits radioactive rays which pass from the seed and the patient's body in straight line paths. A sensing device is employed which includes a tubular collimator having a detector fitted to one end of the hollow opening in the collimator, with the other end of such opening being arranged to receive the straight line rays emitted from the seed. The collimator is manipulated to point generally in the direction of the area where the tumor is located, and the rays emitted from the seed ultimately pass into the collimator opening for sensing by the detector. The detector, in response to being struck by these rays, generates a small electrical pulse which is then fed to a read-out analyzer which visually indicates the frequency of the pulses, as on a dial. When the generated pulse indicates that the magnitude of the emitted ray received by the collimator is at a maximum value, the collimator is known to be aimed directly toward the tumor. The center of the radiation beam of the teletherapy machine is then made to coincide with the central axis of the collimator whereby the radiation beam will also be aimed directly toward the tumor.

Preferably, the collimator and detector are carried on the teletherapy machine by a pivotal mounting which permits the former to be selectively moved into and out of position in alignment with the center line of the radiation beam produced by the head of the machine. Additionally, this mounting for the collimator and detector assembly permits selective movement thereof in a direction along the center line of the radiation beam.

DESCRIPTION OF THE PREFERRED EMBODIMENT

Figure 1:
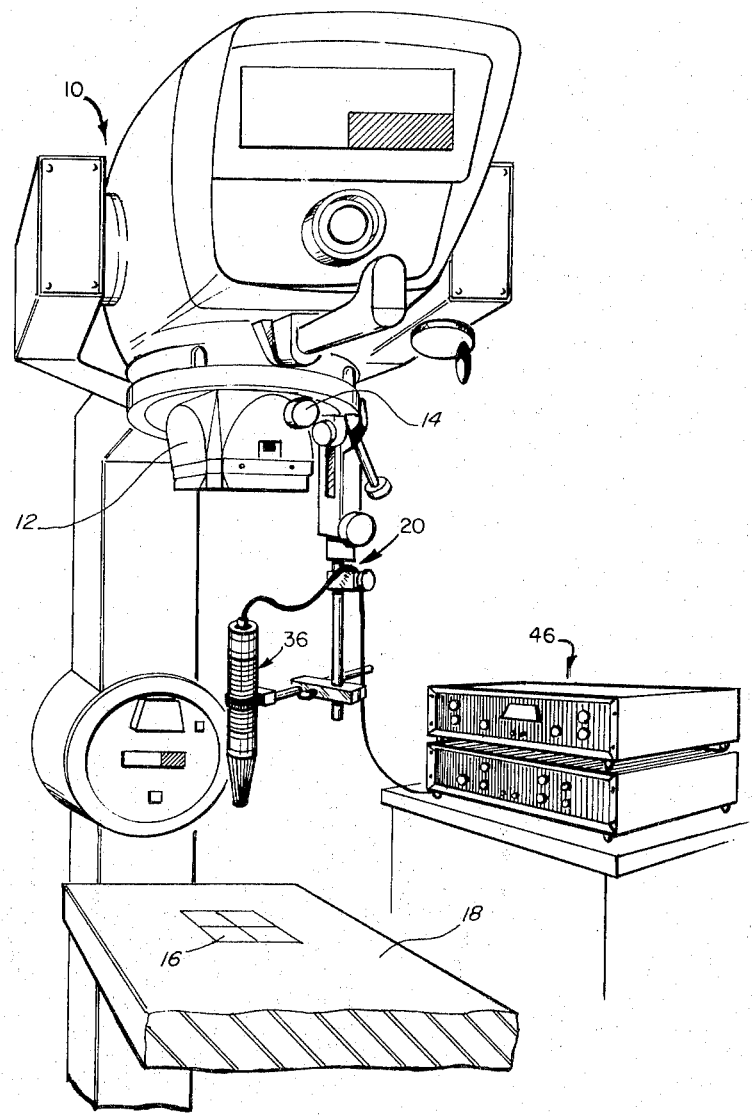
FIG. 1 is a perspective view illustrating the head portion of a teletherapy machine together with the collimator, detector and analyzer of the present invention.

Turning now in greater detail to the accompanying drawings, FIG. 1 illustrates a conventional teletherapy machine 10, which in this instance is a cobalt machine, Model C8M/80, manufactured by Picker Corporation. The teletherapy machine 10 includes a head portion 12 from which a radiation beam is directed downwardly, and the area or field size of the beam being controlled by a regulating knob 14. A typical representation of a field size, with locating cross-hairs presented as shadows, is indicated at 16 on a patient-supporting surface 18.

Figure 2:
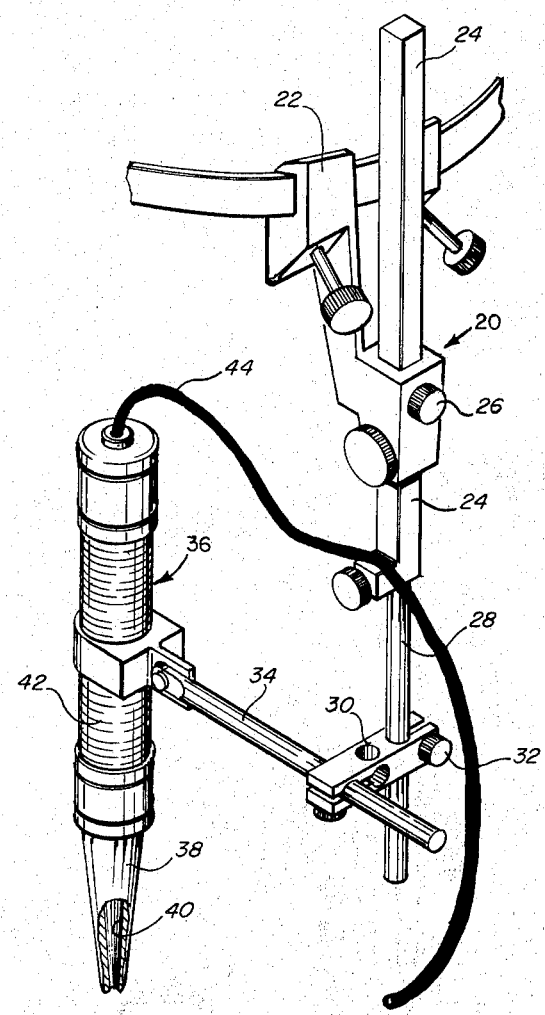
FIG. 2 is a detail view of the collimator and detector of the present invention, and the mounting therefor.
Figure 3:
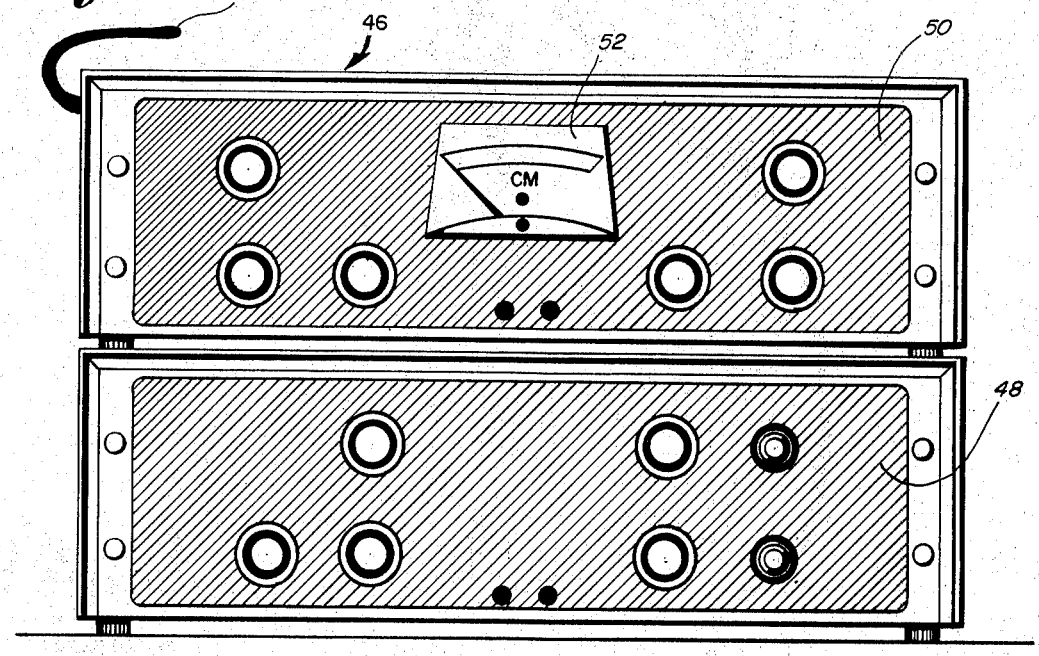
FIG. 3 is a detail view illustrating the controls and indicator panels of the analyzer.

Secured to the teletherapy machine 10 is a mounting 20 which, as best seen in FIG. 2, includes a bracket 22 through which a square post 24 extends in slidable relation thereto for vertical movement along a line parallel to the center line of the radiation beam generated by the head portion 12, a locking screw 26 being provided to hold the post 24 in any selected position thereof. Extending from the post 24 is a cylindrical element 28 on which is mounted a yoke 30 having an adjusting screw 32 for varying the degree of the purchase of the yoke 30 on the cylindrical element 28, whereby the yoke 30 can be selectively secured in fixed relation to the cylindrical element 28 or permitted to turn thereabout. A rod member 34 projects from the other end of the yoke 30 and supports at the extending end thereof a probe 36.

The probe 36 consists of a tubular collimator 38, preferably having a conical shape and being formed of lead, which includes a central channel 40 extending lengthwise along the center line thereof. The collimator 38 is connected to the lower end of a detector 42 arranged to receive radioactive rays transmitted thereto through the channel 40 in a manner to be described in greater detail presently. The detector 42 may be any of a variety of devices on the market today which are designed to detect the presence of radioactive rays and to generate an electrical signal (i.e., a pulse) that varies in direct proportion to the magnitude of the rays detected. The particular detector 42 shown in FIGS. 1 and 2 is a Miniature Scintillation Detector, manufactured as Model No. DS8-20, by Nuclear-Chicago Corp. in Des Plains, Illinois, for detecting low and high energy gamma ray and X-ray radiation.

The relationship of the yoke 30 and the rod 34 is such that, by turning yoke 30 about cylindrical element 28, the probe 36 can be moved between a position (FIG. 1) at which the center line of the collimator channel 40 coincides with the center line of the radiation beam generated from the head portion 12, and a position (not shown) entirely out of the field of such radiation beam. Moreover, by sliding the square post 24 up and down in bracket 24 while the probe 36 is in its FIG. 1 position, the probe 36 can be moved toward or away from a patient positioned on the supporting surface 18.

The aforementioned electrical signals generated by the detector 42 are transmitted through electrical line 44 to read-out equipment 46 which, in the disclosed embodiment, consists of a single channel analyzer 48, manufactured as Model No. 8741 by Nuclear-Chicago Corp., and a ratemeter 50, manufactured as Model No. 8731 by Nuclear-Chicago Corp. The analyzer 48 is designed to separate out undesirable signals (i.e., those not produced by a gamma ray source) received from the detector 42, and to provide an amplified signal to the ratemeter 50 which then represents this signal visually on a c.p.m. (cycle per minute) dial 52 thereon.

In accordance with the present invention, a patient who is affected with a neoplastic disease (i.e., an internally located malignant tumor) which requires radiation therapy is treated by having a small radioactive seed implanted in the tumor by any conventional surgical procedure. A chromium-51 seed, which emanates gamma rays therefrom in straight line paths is preferable, although other radioactive isotopes of equivalent sources could be adapted to the present invention. After such implantation, the patient is positioned on the supporting surface 18 with the tumor located generally adjacent the field of the radiation beam generated by the head portion 12 of the teletherapy machine 10, a typical field being represented in FIG. 1 at 16 as previously indicated.

The probe 36 is then positioned as shown in FIG. 1 with the center line of the collimator channel 40 coinciding with the center line of the radiation beam which will be generated from head portion 12 when the teletherapy machine 10 is activated. It is apparent that some of the straight line gamma rays emanating from the radioactive source implanted in the patient's tumor or the like will enter the collimator channel 40 and be sensed by the detector 42. Likewise, it will be apparent that the magnitude of such channeled rays will increase as the radioactive source in the patient moves to a position directly beneath the collimator 38 whereby the gamma rays from the source proceed in a direct line to the detector 42.

Accordingly, the position of the patient on the supporting surface 18 is adjusted while the operator of the teletherapy machine 10 watches the ratemeter dial 52, and when the dial 52 indicates a maximum value for the gamma rays being sensed by the detector 42, the operator will know that the tumor to be treated lies at the center of the radiation beam which will be generated from head portion 12. The patient is then held at this position and the probe 36 is pivoted out of the field of the radiation beam as previously described, whereupon the teletherapy machine 10 can be activated to commence the therapy.

It is, of course, within the scope of the present invention to keep the patient stationary and adjust the position of the probe 36 and head portion 12 in determining the maximum reading on the dial 52. The significant point is that the center lines of the probe 36 and the radiation beam are moved relative to the radioactive source within the patient until a maximum reading is indicated on dial 52.

In accordance with another feature of the present invention, it is also possible to determine accurately the radiation dosage which is to be rendered to a tumor or the like. It is well known in the art that when radiation therapy is used for internal areas of the body, the radiation dosage emanating from the head 12 of the teletherapy machine 10 must be adjusted to compensate for energy losses resulting from the radiation beam having to pass through bone, muscle, flesh and the like before reaching the area to be treated. Since the internal location of this area cannot always be accurately determined it is often difficult to determine the aforementioned energy losses and to adjust the energy level of the radiation beam accordingly. However, with the present invention this determination can be readily made by comparing the known energy level of the radioactive seed implanted at the treatment area with the radioactive energy level at the external surface of the body, the latter energy level being measured by any conventional equipment designed for measuring radioactive energy. Obviously, the difference between the known energy level of the seed and the energy level measured at the external surface of the patient corresponds to the energy loss in passing from the treatment area through the body, and the dosage level of the teletherapy machine 10 can be adjusted to properly reflect this energy loss.

The present invention has been described in detail above for purposes of illustration only and is not intended to be limited by this description or otherwise to exclude any variation or equivalent arrangement that would be apparent from, or reasonably suggested by, the foregoing disclosure to the skill of the art.

I claim:

1. A method of accurately directing a therapeutic radiation beam to a point within a body at which radiation therapy is required, said therapeutic radiation beam having sufficient voltage and intensity to therapeutically treat tumors or the like within said body, said method comprising the steps of locating within said body at said point a source which emanates straight line rays therefrom, sensing said ray emission to determine a straight line path to said source, and aligning the center of said therapeutic radiation beam to coincide with said straight line path whereby said therapeutic radiation beam will be directed to said point.

2. A method of accurately directing a radiation beam as defined in claim 1 and further characterized in that said source is a radioactive isotope.

3. A method of accurately directing a radiation beam as defined in claim 2 and further characterized in that said sensing of said ray emission includes providing a straight line channel for receiving a portion of said ray emission and includes detecting the magnitude of said channeled ray emission, and in that said center of said radiation beam is directed to coincide with the straight line path of said channeled ray emission when the magnitude of said channeled ray emission is determined to have a maximum value.

4. In combination with a radiation teletherapy machine having a head portion from which a radiation beam is directed, the improvement comprising means for sensing the presence of a source of radioactive ray emission and determining a straight line path to said source, and means for aligning the center line of said radiation beam to coincide with the said straight line path to said source determined by said sensing means whereby said radiation beam will be directed to said source of radiation emission.

5. In combination with a radiation teletherapy machine having a head portion from which a therapeutic radiation beam is directed, said therapeutic radiation beam having sufficient voltage and intensity to therapeutically treat tumors or the like within a body, the improvement comprising a tubular channel member which is open at one end thereof and associated at its other end with means for detecting radiation rays received through the open end of said tubular member, said detecting means producing a signal which varies in proportion to the magnitude of the radiation rays received through said channel member, means mounting said channel member and associated detecting means on said teletherapy machine head for movement to a position at which the axis of said channel member coincides with the center line of the therapeutic radiation beam emitted by said head, and indicating means connected to said detecting means for indicating the magnitude of said radiation rays received through said channel member.

6. In combination with a radiation teletherapy machine, the improvement defined in claim 5 and further characterized in that said detecting means produces an electrical signal in response to receiving said radiation rays through said channel member, and in that said indicating means includes means for visually indicating a selected parameter of said electrical signal produced by said detecting means.

7. In combination with a radiation teletherapy machine, the improvement defined in claim 5 and further characterized in that said mounting means includes pivotal connection means permitting said channel member and associated detecting means to move in a plane perpendicular to said center line of said radiation beam whereby said channel member and associated detecting means can be selectively moved into and out of the path of said radiation beam, and in that said mounting means includes a sliding connector means permitting said channel member and associated detecting means to be moved selectively in a direction along said center line of said radiation beam.

8. In combination with a radiation teletherapy machine having a head portion from which a radiation beam is directed, the improvement comprising a tubular collimator device which is open at one end thereof and mounted at its other end to a detector device for detecting gamma rays received through the open end of said collimator, and for generating electrical pulses at a repetition rate which increases as the magnitude of the gamma waves detected thereby increases, said collimator device and said associated detector device being mounted on said teletherapy machine for selective movement in a plane lying perpendicular to the center line of said radiation beam and in a direction along said center line whereby said collimator device and said associated detector device can be moved to a position at which the axis of said collimator coincides with the centerline of said radiation beam and can then be moved along said center line toward and away from said head portion, read-out analyzer means connected to said detector device to receive said electrical pulses therefrom, said analyzer means including a visual display indicating the frequency of the electrical pulses received from said detector device and thereby indicating the magnitude of the gamma rays detected by said detector device.

* * * * *